US011711205B2

(12) United States Patent
Murray et al.

(10) Patent No.: US 11,711,205 B2
(45) Date of Patent: *Jul. 25, 2023

(54) UNIFIED SECURE DEVICE PROVISIONING

(71) Applicant: Clover Network, LLC, Sunnyvale, CA (US)

(72) Inventors: Brian Jeremiah Murray, Mountain View, CA (US); Jacob Whitaker Abrams, San Mateo, CA (US); Arvin Carl Robert Haywood, Mountain View, CA (US)

(73) Assignee: CLOVER NETWORK, LLC., Sunnyvale, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/028,827

(22) Filed: Sep. 22, 2020

(65) Prior Publication Data
US 2021/0014053 A1 Jan. 14, 2021

Related U.S. Application Data

(63) Continuation of application No. 15/927,741, filed on Mar. 21, 2018, now Pat. No. 10,833,849.

(51) Int. Cl.
*H04L 9/08* (2006.01)
*H04L 9/30* (2006.01)
*H04L 9/32* (2006.01)

(52) U.S. Cl.
CPC .......... *H04L 9/0825* (2013.01); *H04L 9/0861* (2013.01); *H04L 9/30* (2013.01);
(Continued)

(58) Field of Classification Search
CPC ....... H04L 9/0825; H04L 9/0861; H04L 9/30; H04L 9/3263; H04L 9/3268; H04L 9/3297; H04L 63/0442; H04L 63/067
See application file for complete search history.

(56) References Cited

U.S. PATENT DOCUMENTS 5,473,692 A ‡ 12/1995 Davis ...................... G06F 21/00
380/30
5,712,914 A ‡ 1/1998 Aucsmith ............... G06F 21/32
380/30
(Continued)

FOREIGN PATENT DOCUMENTS

CN 106713336 A ‡ 5/2017
CN 106713336 A 5/2017
(Continued)

OTHER PUBLICATIONS

First Examination Report dated Jun. 26, 2020 from European Patent Application No. 19161458.5, 7 pages.‡

(Continued)

*Primary Examiner* — Sarah Su
(74) *Attorney, Agent, or Firm* — Foley & Lardner LLP

(57) ABSTRACT

Systems and methods for provisioning secure terminals for secure transactions are disclosed herein. A disclosed method includes generating a key using a key generator element on a secure terminal and sending a key validation request for the key from the secure terminal to a provisioning device. The method also includes parsing the key validation request and generating a key validation for the key and a trusted time stamp on the provisioning device. The method also includes sending, from the provisioning device, the key validation and the trusted time stamp to the secure terminal. The method also includes setting a clock on the secure terminal using the trusted time stamp and storing the key validation at the secure terminal.

19 Claims, 4 Drawing Sheets

(52) U.S. Cl.
CPC .......... *H04L 9/3263* (2013.01); *H04L 9/3268* (2013.01); *H04L 9/3297* (2013.01)

(56) References Cited

U.S. PATENT DOCUMENTS

| | | | | |
|---|---|---|---|---|
| 6,314,521 | B1 ‡ | 11/2001 | Debry | ............... H04L 9/3263 726/10 |
| 7,526,644 | B2 ‡ | 4/2009 | Kocher | ............... H04L 9/3236 713/15 |
| 7,620,187 | B1 ‡ | 11/2009 | Didier | ............... H04L 9/083 380/247 |
| 9,513,755 | B2 | 12/2016 | Chai et al. | |
| 9,513,756 | B1 | 12/2016 | Mishra et al. | |
| 9,704,355 | B2 | 7/2017 | Beatty et al. | |
| 9,792,783 | B1 | 10/2017 | Beatty et al. | |
| 10,057,243 | B1 ‡ | 8/2018 | Kumar | ............... H04W 8/005 |
| 10,140,612 | B1 | 11/2018 | Murray | |
| 10,326,797 | B1 * | 6/2019 | Murray | ............... G06Q 20/3227 |
| 10,833,849 | B2 * | 11/2020 | Murray | ............... H04L 9/30 |
| 2005/0144439 | A1 * | 6/2005 | Park | ............... H04L 63/06 713/155 |
| 2006/0080536 | A1 * | 4/2006 | Teppler | ............... H04L 9/3218 713/176 |
| 2006/0236098 | A1 * | 10/2006 | Gantman | ............... H04L 63/0823 713/158 |
| 2012/0166267 | A1 | 6/2012 | Beatty et al. | |
| 2012/0290868 | A1 ‡ | 11/2012 | Gladwin | ............... G06F 11/0727 714/4.1 |
| 2013/0326633 | A1 * | 12/2013 | Murao | ............... H04L 63/123 726/26 |
| 2016/0005020 | A1 | 1/2016 | Fernando et al. | |
| 2017/0309135 | A1 | 10/2017 | Beatty et al. | |
| 2018/0033255 | A1 | 2/2018 | Beatty et al. | |
| 2019/0028269 | A1 ‡ | 1/2019 | Lu | ............... H04L 9/0822 |
| 2019/0052464 | A1 * | 2/2019 | Doliwa | ............... H04L 63/0807 |
| 2020/0358785 | A1 * | 11/2020 | Fincannon | ............... H04L 63/108 |
| 2020/0394653 | A1 * | 12/2020 | Lim | ............... G06Q 20/401 |

FOREIGN PATENT DOCUMENTS

| | | | | |
|---|---|---|---|---|
| EP | 0624014 | A2 ‡ | 11/1994 | ............ G06Q 20/341 |
| EP | 0624014 | A2 | 11/1994 | |
| EP | 1022640 | A2 ‡ | 7/2000 | ............ G06F 21/645 |
| EP | 1022640 | A2 | 7/2000 | |
| EP | 0869637 | A3 ‡ | 12/2000 | ............ H04L 9/3263 |
| EP | 0869637 | A3 | 12/2000 | |
| EP | 1841124 | A1 ‡ | 10/2007 | |
| EP | 1841124 | A1 | 10/2007 | |
| EP | 3544226 | A1 * | 9/2019 | ............ H04L 63/0442 |
| WO | 9212485 | A1 | 7/1992 | |
| WO | WO-9212485 | A1 ‡ | 7/1992 | |
| WO | 9854634 | A1 | 12/1998 | |
| WO | WO-9854634 | A1 ‡ | 12/1998 | |

OTHER PUBLICATIONS

Hormann et al., "Evaluation of Certificate Validation Mechanisms", Computer Communications, Elsevier Science Publishers BV, Amsterdam, Netherlands, vol. 29, No. 3, Feb. 1, 2006, pp. 291-305.‡

Kim et al., "Accountable Key Infrastructure (AKI)", World Wide Web, International World Wide Web Conferences Steering Committee, Geneva, Switzerland, May 13, 2013, pp. 679-690.‡

Extended European Search Report dated Jul. 4, 2019 from European Patent Application No. 19161458.5, 10 pages.‡

Office Action dated May 31, 2021 from Canadian Application No. 3,077,271, 4 pages.

Extended European Search Report dated Jan. 13, 2021 from European Application No. 20187626.5, 7 pages.

Kim et al., "Accountable Key Infrastructure (AKI)", World Wide Web, International World Wide Web Conferences Steering Committee, Geneva, Switzeriand, May 13, 2013, pp. 679-690.

Nonfinal Office Action dated Apr. 16, 2020 from U.S. Appl. No. 15/927,741, 36 pages.

Notice of Allowance dated Aug. 21, 2020 from U.S. Appl. No. 15/927,741, 36 pages.

\* cited by examiner
‡ imported from a related application

UNIFIED SECURE DEVICE PROVISIONING

CROSS REFERENCE TO RELATED APPLICATIONS

This application is a continuation of U.S. patent application Ser. No. 15/927,741, filed on Mar. 21, 2018 and entitled "Unified Secure Device Provisioning", which is hereby incorporated by reference in its entirety for all purposes.

BACKGROUND

In certain technical environments, a secure terminal needs to be provisioned with information that will allow the terminal to conduct secure communications. For example, the secure terminal may need to be provided with a cryptographic key, a unique identifier, a secure time stamp, and other information that can facilitate secure communications in accordance with the protocol of a secure network to which the terminal will be made a part. As another example, the terminal may be able to generate its own key but will need to have the key validated by a separate key validation system. The provisioning of this information can be conducted as a final stage in a manufacturing process for the terminal, or upon delivery to an end user, such that the terminal is configured to operate within a secure network that is specific to a subset of the manufacturer's customers.

One specific example of a key validation procedure is one in which a digital certificate associated with the key is signed by a certificate signing authority (CSA). There are numerous key validation procedures that can be used for secure communications. The certificate signing authority is a trusted entity that is tasked with validating keys for terminals that will take part in secure communications on a given network. In particular, the public key infrastructure (PKI) certificate is a known method in which devices are provisioned for secure communication using a specific public key. In the framework of PKI, secure terminals in the network are configured to generate their own key pair, comprising a public key and a private key, to be used for asymmetric encryption. However, before other terminals in the network will trust new terminals, the new terminal must validate its key. Key validation may be carried out, for example, by obtaining a signed certificate for a public key from a certificate issuer.

FIG. 1 illustrates an example of how this procedure is conducted. A secure terminal 100 can be configured to include a key generator 101 that generates a paired public key 102 and private key 103 for asymmetric encryption, wherein they are called a key pair 104. A key pair can be separated after generation and sent to other elements on the secure terminal, or other devices. For example, private keys can be sent to key storage 105 for future use by the secure terminal. The public keys can be sent to a key validation requestor 106 to create a key validation request for a certificate issuer. The certificate issuer will provide a signed certificate 107 in response to an appropriate key validation request. In certain embodiments, the certificate issuer 108, responsible for signing certificates, can be a certificate signing authority, and may be housed in an alternative terminal, server, or other device, to the secure terminal. When the key validation provider 109 within the certificate issuer receives the public key and its accompanying key validation request, which may be represented by a certificate, it can sign the certificate following PKI standards. In this example, the signed certificate can be returned to the secure terminal and may be received by the key validation verifier 110. The key validation verifier can verify the signed certificate (verified signed certificate 111), according to the same PKI standards, to allow the secure terminal to make use of the public key. In one example, the secure terminal can distribute the verified public key to another terminal within the secure network while the private key of the key pair is retained to enable secure asymmetrically encrypted communication between the terminals.

SUMMARY

Systems and methods for provisioning secure terminals for secure transactions are disclosed herein. The provisioning can occur prior to when the device is deployed for actual use by an end user such as in a factory prior to when the secure terminal is shipped to an end user. In a specific application, the provisioning can occur in a secure key injection room in a manufacturing facility. The system facilitates the provisioning of secure terminals with a key validation, a trusted time stamp, and other information for the integration of secure terminals into a secure network. The provisioning of both the key validation and trusted time stamp can be carried out by a provisioning device following the receipt of a key validation request. The provisioning device can provide both the time stamp and the key validation automatically in response to a single key validation request. The trusted time stamp can be incorporated into or attached to the key validation. The combined trusted time stamp and key validation could be sent in a single message from a provisioning device back to the secure terminal.

The system can include the secure terminal and a provisioning device. The provisioning device can be a separate piece of equipment in a manufacturing facility that is communicatively connected to the secure terminal via a connection such as a universal serial bus or Ethernet connection. A key validation request generator on the secure terminal can generate a request for a key to be validated by the provisioning device. In certain approaches, the key can be generated on the secure terminal using a key generator. In these approaches, the key can be sent from the key generator to the key validation request generator in order to generate the key validation request using the key. The key validation request can then be sent over the connection to the provisioning device. The provisioning device can then parse the key validation request using a key validation request parser, validate the key, and return a key validation and secure time stamp to the device using the same connection or another similar communicative connection between the two devices. The secure time stamp and key validation request could be sent from the provisioning device to the secure terminal either sequentially or in combination. In certain approaches, the secure time stamp can be provided by a trusted time source on the provisioning device. The key validation could then be verified by the secure terminal. If the key validation is verified, the secure terminal could then store the key validation for later use to prove its membership in the secure network, and could also use the secure time stamp to set an internal clock on the secure terminal.

Certain benefits accrue to approaches in which a secure time stamp is provided in a consecutive or integrated fashion with a key validation, or other secure device provisioning information, that is usually conducted in a manufacturing facility or secure key injection room. In particular, advantages can accrue to approaches in which a time stamp is provisioned at a manufacturing facility as opposed to being provisioned via the internet when the device is first connected to the internet by an end user. Secure time stamps are being used by an increasing number of systems to verify whether a device should be allowed to authenticate and connect to the network, while other systems will only provide a secure time stamp to a device that has already proven itself to be a valid member of the system. An example of such a system is TLS mutual authentication, where both components can only communicate after exchanging and validating certificates, including verifying that each component's internal time falls within the validity periods of the certificates. As a result, there is the potential for a device to be caught in a catch-22 and be incompatible with certain secure networks if it only receives a partial provision at a manufacturing facility, and is then shipped out with an eye towards completing the provisioning process remotely when the device is deployed by an end user.

In some of the approaches in accordance with this disclosure, the key validation can be generated using a secure cryptographic element. For example, the key validation could involve generating a cryptographically verifiable message to be included with the key on the secure terminal which verifies that the secure terminal is part of the secure network. In certain approaches, the secure terminal would then verify the authenticity of its own key validation, as received from the provisioning device, by verifying the cryptographically verifiable message. In these approaches, the time stamp could be used by the secure cryptographic element to generate the cryptographically verifiable message. Such approaches would be beneficial in that the time stamp and key validation would both be verified in a single step by checking the same cryptographically verifiable message.

In certain approaches, the key validation request can be a certificate signing request, and the key validation can be a signed certificate chain. The certificate signing request could be a request for a PKI certificate. The certificate could be in accordance with the X.509 format. In these approaches, the key generator could be configured to generate a key pair for asymmetric encryption, and could store the private key on the secure terminal while the public key was sent to the key validation request generator to be used for generating the key validation request. The key validation request generator could be a certificate singing request generator use to produce the certificate singing request for the public key. The certificate signing request could then be transmitted to the provisioning device and interact with a certificate authority on the provisioning device represented by the key validation request parser and a secure cryptographic element. In these approaches, the key generator request parser on the provisioning device could be a certificate signing request parser. The secure cryptographic element on the provisioning device could generate a signature for the certificate using data from the key validation request. This data can be referred to as certificate data. The time stamp could be appended to the signed certificate for transmission back to the secure terminal. Alternatively, as described below, the time stamp could be part of the certificate data used to generate the signature for the certificate.

The approaches described in the previous paragraph are a subset of approaches in which the key validation involves generating a cryptographically verifiable code. Specifically, the cryptographically verifiable code can be the signature on a digital certificate mentioned in the previous paragraph. In these approaches, the trusted time stamp can be used as part of the certificate data (i.e., the time stamp can be used to generate the digital signature for the digital certificate). As a result, the time stamp can be verified by the secure terminal at the same time the digital signature on the certificate is verified. Specifically, if a man-in-the-middle attack changed the time on the signed certificate, it would be detected by a mismatch between the signature and the certificate data when the secure terminal attempted to verify the signed certificate.

If the trusted time stamp is included in the certificate data of a digital certificate, it could be added to a "miscellaneous" field in accordance with most digital certificate specifications. However, in certain approaches, the trusted time stamp could be used as the certificate validity start period for the signed certificate. In such approaches, the secure terminal could achieve faster key validation verification through the reduced amount of data to be processed with the key validation. Furthermore, in certain implementations, the secure terminal may execute key verification and key storage in a secure processor with highly constrained resources in terms of both processing power and data storage. Therefore, reducing the data size of the certificate is beneficial simply because a certificate with less data takes up less memory.

In one approach, a method for provisioning a secure terminal is provided. The method includes generating a key using a key generator element on the secure terminal. The method also includes sending a key validation request for the key from a key validation request generator element on the secure terminal to a provisioning device. The method also includes receiving the key validation request, at a key validation request parser element on the provisioning device. The method also includes parsing the key validation request with the key validation request parser element on the provisioning device. The method also includes generating, on the provisioning device and in response to receiving the key validation request, both a key validation and a trusted time stamp. The method also includes sending, from the provisioning device, the key validation and the trusted time stamp to the secure terminal. The method also includes receiving the key validation and the trusted time stamp, at the secure terminal. The method also includes setting a clock on the secure terminal using the trusted time stamp, and storing the key validation on the secure terminal.

In another approach, a method for provisioning a secure terminal is provided. The method includes generating a key using a key generator element on the secure terminal. The method also includes sending a key validation request for the key from a key validation request generator element on the secure terminal to a provisioning device. The method also includes receiving the key validation request at a key validation request parser element on the provisioning device. The method also includes parsing the key validation request with the key validation request parser element on the provisioning device. The method also includes generating, on the provisioning device, a key validation for the key validation request generator, and a trusted time stamp attached to the key validation. The method also includes sending, from the provisioning device, the key validation and the trusted time stamp to the secure terminal. The method also includes receiving the key validation and the trusted time stamp, at the secure terminal. The method also includes setting a clock on the secure terminal using the trusted time stamp, and storing the key validation on the secure terminal.

In another approach, a system for provisioning a secure terminal is provided. The system includes a key generator element on the secure terminal that generates a key. The system also includes a provisioning device connected to the secure terminal by a connection. The system also includes a key validation request generator element on the secure terminal that sends a key validation request for the key to the provisioning device using the connection. The system also includes a key validation request parser element on the provisioning device that receives and parses the key validation request. The system also includes a trusted time source element on the provisioning device that generates a trusted time stamp in response to the key validation request. The system also includes a key validation parser element on the secure terminal that receives the trusted time stamp from the provisioning device, and receives and parses a key validation. The system also includes a clock on the secure terminal that is set by the key validation parser element using the trusted time stamp. The system also includes a key storage element on the secure terminal that stores the key validation from the provisioning device. The provisioning device also generates the key validation in response to the key validation request, and subsequently sends the trusted time stamp and key validation to the secure terminal using the connection.

DETAILED DESCRIPTION

Specific methods and systems for provisioning a secure terminal in accordance with the summary above are provided in this section. The methods and systems disclosed in this section are nonlimiting embodiments of the invention and are provided for explanatory purposes only. The detailed disclosure of these specific embodiments should not be used to constrict the full scope of the invention.

Figure 1:
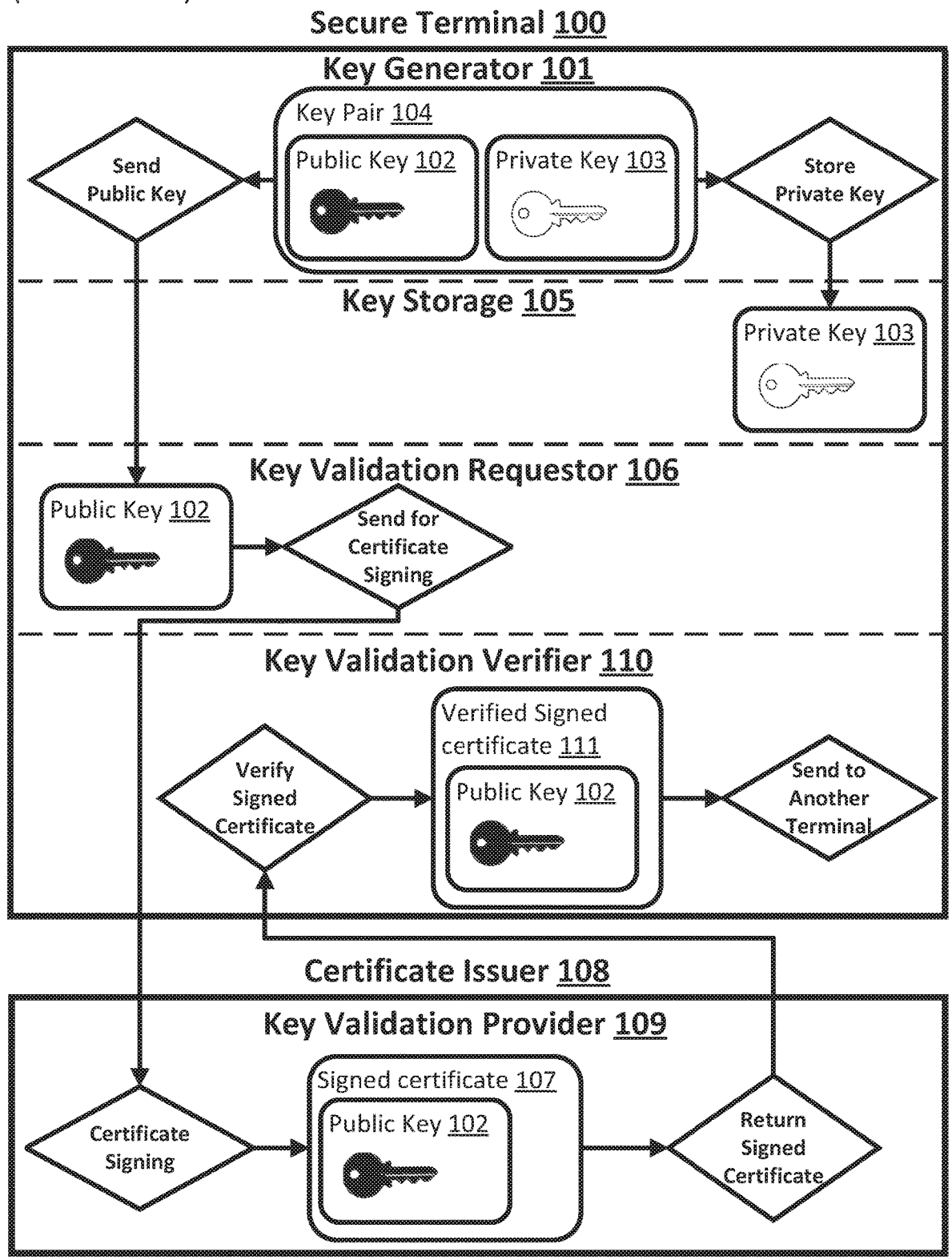
FIG. 1 illustrates a block diagram and flow chart demonstrating the provisioning of a secure terminal by a certificate issuer, with signed certificates referenced to a specific public key, in accordance with the related art.
Figure 2:
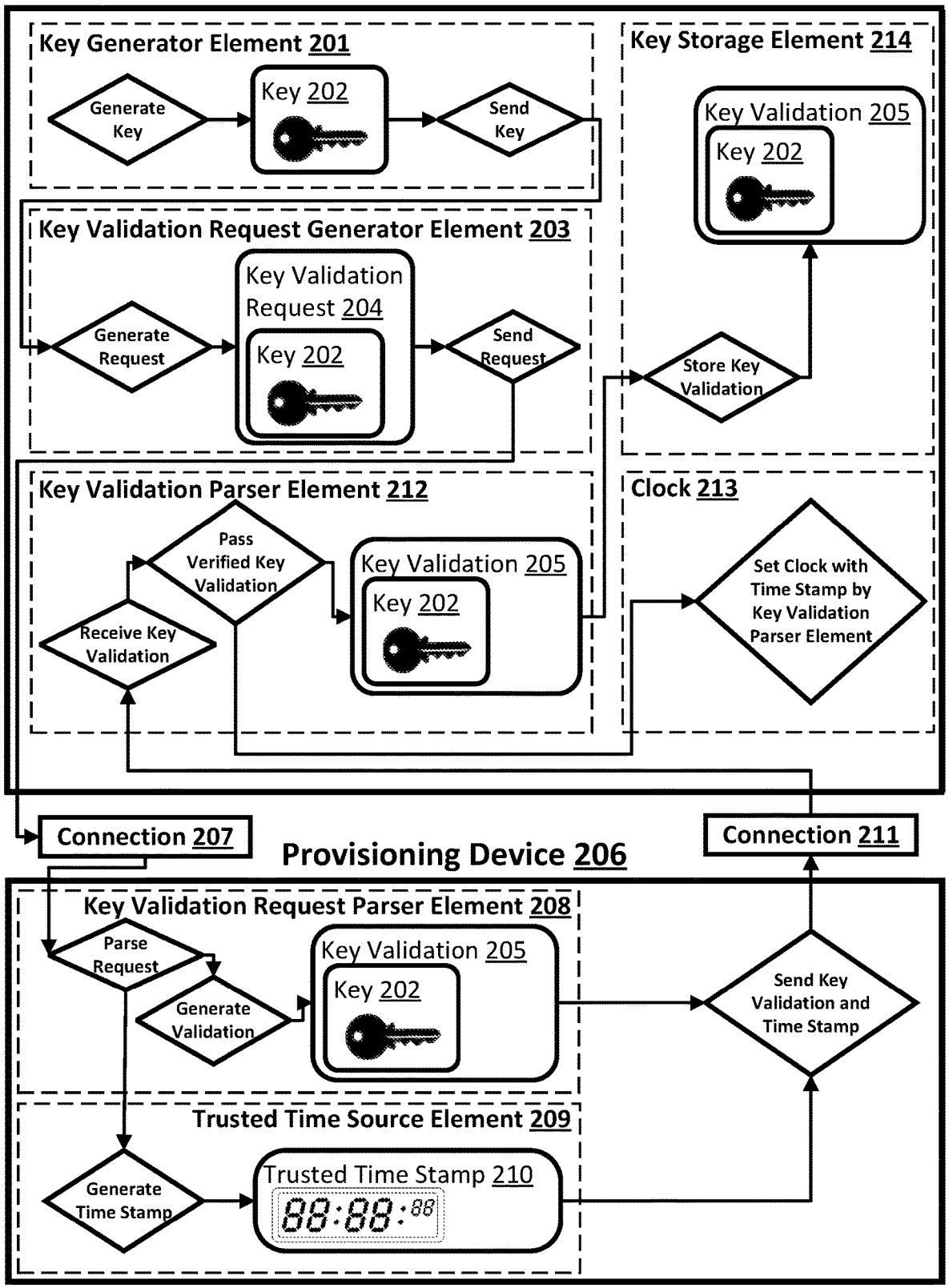
FIG. 2 illustrates a block diagram and flow chart demonstrating the provisioning of a secure terminal by a provisioning device, with a key validation and a trusted time stamp, in accordance with approaches disclosed herein.

FIG. 2 provides a block diagram and flow chart for a set of methods and systems for provisioning a secure terminal 200 that are in accordance with some of the embodiments disclosed herein. Secure terminal 200 and provisioning device 206 can be discrete physical devices located in a secure manufacturing facility. In certain technical environments, a provisioning device may be called a key gun or a key injection device. The subblocks of secure terminal 200 and provisioning device 206 in FIG. 2 may represent individual hardware elements or individual software modules implemented via a processor and memory within those discrete devices. The lines connecting the blocks illustrate the flow of information, as encoded in electronic signals or otherwise, as the secure terminal 200 is provisioned for secure communication.

Secure terminal 200 can be a discrete electronic device designed to engage in secure communication. The terminal can be a computer terminal, a smartphone, a point of sale terminal, a repeater, a beacon, a sensor, or any other device that handles sensitive information. The secure terminal includes a key generator element 201. The key generator element can be used to generate a key 202. The key 202 can be a secret key used for symmetric encryption or a public-private key pair used for asymmetric encryption. The key generator element 201 can include a random number generator and cryptographic logic used to generate a key that is truly random and capable of being used for secure communications. The key 202 can be any key capable of being used to generate digital signatures, such as a 2048 bit or 4096 bit RSA key, or a 26 bit ECC key. The key 202 generated by the key generator element 201 will be used by the secure terminal to encrypt data for transmission to another node on a secure network, or to decrypt data received from another node on the secure network. As such, the key 202 can be stored on a secure element within the secure terminal 200 and kept isolated from other portions of the secure terminal 200 that may be more sensitive to attack. The secure terminal 200 can include a tamper detection mesh that isolates the secure element, and a tamper sensor that deletes the keys if the tamper detection mesh detects a tamper.

The secure terminal 200 includes a key validation request generator element 203. The key validation request generator element can be used to generate a key validation request 204. After encrypted keys are generated on a secure terminal, a key validation request 204 may be the first step in the provisioning process, where keys are associated with unique identifiers with respect to the network in which the secure terminal will communicate. For example, the key validation request 204 can be generated with respect to a specific key 202, and sent to a provisioning device 206. These identifiers can be included in key validations, such as a key validation 205. More specifically, the key validation request can be a certificate signing request, and the key validation can be a signed PKI certificate. Accordingly, certificate signing requests (CSR) may be fulfilled by signed certificates as an example of how key validation requests are fulfilled by key validations.

Provisioning can be performed by a provisioning device 206, which can be a discrete electronic device separate from the secure terminal 200, while connected with a data connection 207 to securely transfer information between devices. The data connection 207 can follow any design standard that ensures secure connection, including universal serial bus (USB), Ethernet, Thunderbolt, IEEE 1394—Firewire, and serial advanced technology attachment (SATA). The steps of the provisioning process can include the supply, certification, or validation of information relevant to assigning relevant cryptographic identifiers to keys, such as a name, a terminal identification number, a time, or additional encryption elements. The provisioning device has a computer with software that enables the receiving and parsing of key validation requests 204, performed by a key validation request parser element 208. Upon successful parsing of the request, the key validation can be generated for the specified key. Additionally, in certain approaches the key validation request will include a validation request for multiple keys that are destined to be stored in separate and discrete elements associated with secure terminal 200 such as in a secured peripheral on the terminal, and in a main secure processor for the terminal.

Provisioning device 206 can include a trusted time source element 209. The trusted time source element 209 can provide the provisioning device with a trusted time stamp 210 which is trusted by a secure network to serve as a secure time marker. In certain technical environments, the process of secure establishment of a time via cryptographic techniques is referred to as trusted time stamping. The trusted time stamp 210 can be used to verify the temporal information of a communication or transaction, in addition to being used as a reference for key validation, or any other type of secure use. For example, the trusted time stamp 210 can be used to check if a key 202 is currently valid, or if it has expired. The trusted time source element 209 can be supplied with the trusted time from a source independent of the secure terminal and the provisioning device, including a network time protocol server, a trusted time transmitted by radio frequency transmission on a GPS frequency band, a manual delivery by a user via an interface on the provisioning device, such as with a touch screen keyboard, or USB or other wired connection, or any additional method.

In FIG. 2, a trusted time stamp 210 and a key validation 205 are sent from provisioning device 206 to secure terminal 200 over connection 211. In one example, the sending of a trusted time stamp 210 and a key validation 205 proceeds after they are generated on the provisioning device 206, where the generating is in response to receiving a key validation request 204. In another example, a key validation 205 is generated for the key validation request generator on the provisioning device 206, and a generated trusted time stamp 210 is attached to the key validation 205. In any specific case, the generating of the trusted time stamp 210 can be performed by a trusted time source element 209 on the provisioning device 206. Connection 211 can be the same as connection 207 or it can be a separate physical connection or channel. The key validation 205 and trusted time stamp 210 sent from the provisioning device 206 can be received by the key validation parser element 212 on the secure terminal 200. In certain technical environments, the provisioning of a key validation and a trusted time stamp can occur at different temporal steps during the manufacturing and distribution of secure terminals, and, alternatively or simultaneously, at different locations as well. Accordingly, the unification of receiving the key validation 205 and trusted time stamp 210 in the same step is a desired operations benefit. The key validation parser element 212 can parse the key validation 205. The key validation parser element 212 may verify the key validation 205 for accuracy, timeliness, and other factors that ensure the veracity of the key validation. For example, the unique identifier assigned to the key 202 could be verified using an asymmetric cryptographic procedure that is asymmetric to the procedure used to generate the unique identifier. If the key validation 205 is proper and recognized by the key validation parser element 212, it is considered verified. A verified key validation 205 can be made available to the other elements in the secure terminal 200. The secure terminal 200 includes a key storage element 214 where verified key validations 205 from the provisioning device 206 may be stored for future use and redistribution through a secure network.

Secure terminal 200 includes a clock 213. Clock 213 can be implemented in a secure element, such as a secure processor, on secure terminal 200. This secure element may be the same secure element mentioned above and may be contained in a tamper mesh. In certain protocols, secure terminal 200 needs to be synchronized to a certain epoch used by a secure network, and the clock's time needs to be isolated from tampering to maintain security of the network. As such, setting the clock's time can be an important step in provisioning secure terminal 200. The clock can be set using the trusted time stamp 210 by the key validation parser element 212 if the key validation 205 is verified. In certain approaches, the clock 213 may begin using the trusted time stamp 210 as soon as the time stamp is received by the secure terminal 200 and can then be discarded or flagged as unverified if the key validation parser element 212 fails to verify the key validation 205. Such a procedure would make sense in situations where the key validation verification took an appreciable amount of time such that the time stamp would be stale at the end of verification. The clock 213 can be powered by an internal battery and can be continuously running regardless of whether the clock 213 has been set to a specific time. For example, the clock 213 could be set to an arbitrary date and time, and begin marking a duration of time immediately and continuously regardless of whether the trusted time stamp 210 has been used to set the clock 213. The clock 213 may be used for additional methods, such as verification of the key validation as will be described below.

Figure 3:
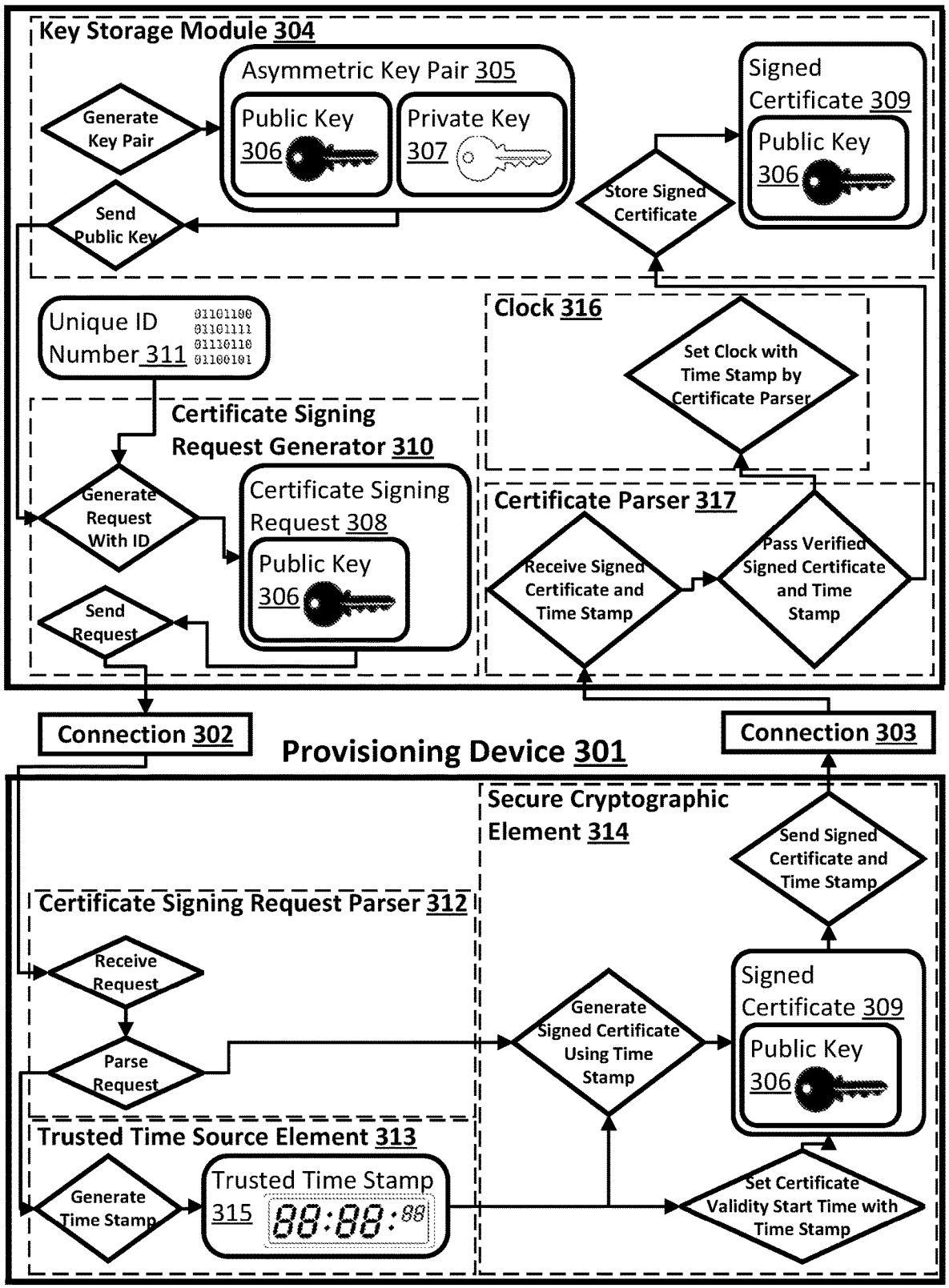
FIG. 3 illustrates a block diagram and flow chart demonstrating the provisioning of a secure terminal by a provisioning device with PKI encryption elements, including a certificate signing request generator that can use a unique ID number on the secure terminal for request generation, and a secure cryptographic element on the provisioning device that can use a trusted time stamp to set a signed certificate validity start time, in accordance with approaches disclosed herein.

FIG. 3 provides a block diagram and flow chart for a set of methods and systems for provisioning a secure terminal 300 that are in accordance with some of the approaches disclosed herein. The subblocks of secure terminal 300 and provisioning device 301 in FIG. 3 may represent individual hardware elements or individual software modules implemented via a processor and memory within those discrete devices. The lines connecting the blocks illustrate the flow of information, as encoded in electronic signals or otherwise, as the secure terminal 300 is provisioned for secure communication. Secure terminal 300, provisioning device 301, connection 302, and connection 303, can have the same, or similar, embodiments as described previously with secure terminal 200, provisioning device 206, connection 207, and connection 211, respectively. For example, the secure terminal 300 can be any device that collects and transmits secure information, the provisioning device 301 can be any device that provisions the secure terminal 300, and the data connection 302 and data connection 303 can securely transfer information between devices using any design standard that ensures secure connection.

The secure terminal 300 includes a key storage module 304 that can generate a key, which can be a cryptographically asymmetric key pair 305, and which can have the same, or similar, embodiments as described previously for a key 202, in addition to other properties. For example, an asymmetric key pair 305 can include a public key 306 and a private key 307. When a public key 306 and private key 307 are paired, one key can have the function of encrypting information and the other key can have the function of decrypting the same information. In a symmetric configuration, both parties to a secure transaction will hold a secret key that can be used to secure communications between them. In an asymmetric configuration, one key can encrypt and another key can decrypt in a fixed configuration. The defining of the keys, with respect to each other and the secure communication network, can be determined according to an infrastructure standard in which the keys operate. In one configuration of an asymmetric key pair 305, the public key 306 can be assigned to a user with an unverified identity for encrypting information to be sent. In tandem, the private key 307 may be retained, by the entity that generated the key pair for secure communication, for decrypting information encrypted by the public key. A known weakness in this method is the inability to bind a public key to any single user, making use of a public key prone to a man-in-the-middle attack where the attacker "spoofs" the identity assigned to the public key and gains access to the secure communication without the knowledge of the original public key assignee or the owner of the private key.

Certificate authorities, also known as certificate signing authorities, act as trusted third-party entities in PKI that can enable the secure binding of an identity to a public key 306 to avoid authentication vulnerabilities, including the one described above, through the issuance of certificates. The provisioning device 301 can act as a certificate authority when provisioning a secure terminal 300 with a key validation. For example, a key validation request can be a certificate signing request 308, wherein the certificate signing request 308 can include a public key 306. Continuing the example, a key validation can be a signed certificate 309 for the public key 306. The certificate and signed certificate can include any number of fields of data for which the certificate signing authority can provide a validation in the form of a signature. As stated, one field of data can be a string of characters representing a public key that is validated through the addition of a signature to the certificate. The fields of data can also include a unique identity of the secure terminal, a network identifier, a certificate validity expiration time, and a certificate validity start time.

The method of provisioning a secure terminal 300 is dependent on the configuration of the secure terminal 300 and of the provisioning device 301, and the encryption methods used for certificate signing. In one example, a secure terminal 300 with a key storage module 304 generates an asymmetric key pair 305, comprising a public key 306 and a private key 307. The key validation request for public key 306 can be generated by a key validation request generator element, wherein the key validation request element is a certificate signing request generator 310. It is possible to use numerical elements extracted from hardware identification numbers, or other sources, on the secure terminal 300 for enhanced encryption in the certificate signing request 308 generation by embedding said elements in the request. In an example where a key validation request is a certificate signing request 308, the certificate signing request generator 310 can use a unique identification number 311 of the secure terminal 300 to generate the certificate signing request 308. In the context of the provisioning process as a whole, this can be beneficial for assuring the certificate signing request generator 310 can construct the certificate signing request such that it can contain a cryptographic signature that proves that the secure terminal 300 possesses the private key 307 corresponding to the paired public key 306 that is embedded in the certificate signing request 308.

When a key validation request, such as a certificate signing request 308, is generated by a key validation request generator element, such as a certificate signing request generator 310 on a secure terminal 300, the sending of the key validation to the next stage of provisioning can be performed by the same element that generated it. Information sent from the secure terminal 300, can be sent to a provisioning device 301 through a wire connection 302. In one specific example, the receiving of a key validation on the provisioning device 301 can be conducted by a key validation request parser element, specifically by a certificate signing request parser 312. In another example, the parsing of a key validation request on the provisioning device 301 can be conducted by a certificate signing request parser 312. When the certificate signing request 308 is parsed, a prototype signed certificate can be generated. In certain approaches, this process will involve determining that elements of the request are verified and extracting embedded values from the request.

A trusted time source element 313 and secure cryptographic element 314 can be included on the provisioning device 301. The trusted time source element 313, which can be similar to, the same as, or have additional properties to the trusted time source element 209, can generate a trusted time stamp 315, which can be similar to, the same as, or have additional properties to the trusted time stamp 210. The provisioning device can generate a key validation using secure cryptographic element 314. When information is sent from the provisioning device 301 to the secure terminal 300 by the wire connection 303, the sending of the key validation and the trusted time stamp 315 can be conducted by a secure cryptographic element 314. The key validation information and trusted time stamp 315 information may be configured or combined in different ways before sending. For example, the trusted time stamp 315 can be attached to the key validation. In another example, the trusted time stamp 315 can be used by the secure cryptographic element 314 to generate the key validation. In a more specific example, the trusted time stamp 315 is used to set a field of certificate data and is thereby used to generate the signature for signed certificate 309. In particular, the trusted time stamp 315 could be used to set the certificate validity start time.

Provisioning device 301 can sign certificates provided with a certificate signing request using secure cryptographic element 314. The signing process can involve adding a cryptographic signature to a prototype certificate to generate a signed certificate. The secure cryptographic element 314 may contain a private key, unique to a secure network for which secure terminal 300 is being provisioned, that is used to generate the cryptographic signature. Members of the secure network may include a corresponding public key that is used to verify the signed certificate using the signature and a comparison with the certificate data. The content of the certificate, including the data in the data fields mentioned above, can be used by the secure cryptographic element 314 to generate the cryptographic signature. For example, the secure time stamp can be appended to a field of the certificate before it is signed and used to generate the cryptographic signature. Such an approach could be utilized if the standard for the certificate allowed for miscellaneous fields of information to be added to a certificate. In certain approaches, the certificate will follow the X.509 PKI standard which does allow for miscellaneous data to be added to the certificate. As stated, the secure time stamp could also be appended to the certificate in the form of the certificate validity start time. In either approach, the secure time stamp would then be used by the secure cryptographic element to generate the signature. Other fields such as the unique identifier of the secure terminal, if present, could also be used to generate the signature. Using these approaches, secure cryptographic element 314 can be used in the process of transforming the prototype signed certificate generated by the certificate signing request parser 312 into signed certificate 309.

The secure terminal 300 can include a key validation parser element and a clock 316, where the key validation parser element and the clock 316 can have the same, or similar, features as previously described for the key validation parser element 212 and clock 213, respectively. The key validation parser element can be a certificate parser 317, which can conduct the receiving of a key validation and a trusted time stamp 315, and which can set the time of the clock 316. In particular, if the trusted time stamp 315 is integral to the signed certificate, the certificate parser element 317 can extract the trusted time stamp for the secure terminal, and the trusted time stamp can be used to set the clock on the secure terminal. After being verified, the signed certificate can be stored at a key storage element such as key storage module 304.

Figure 4:
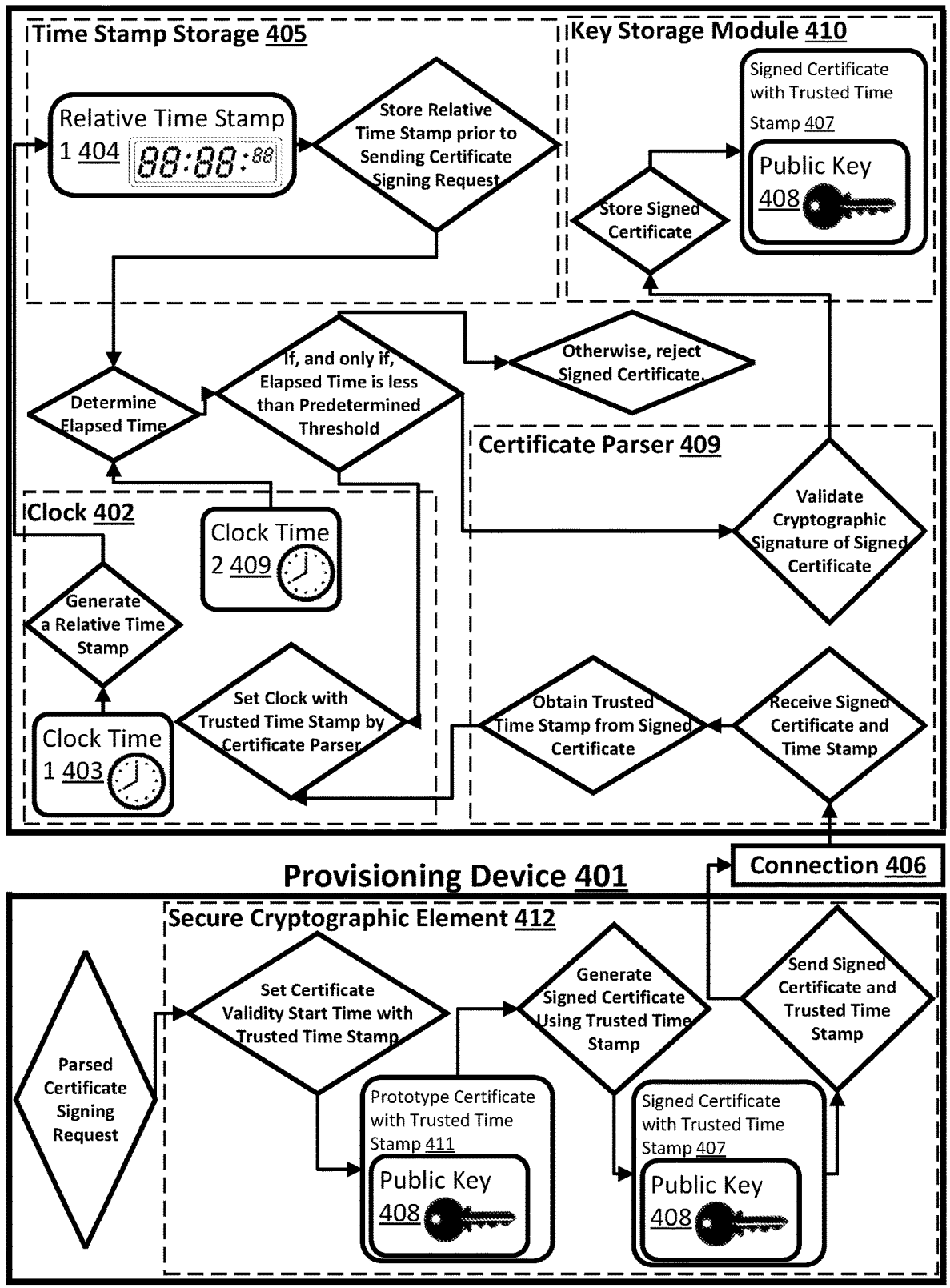
FIG. 4 illustrates a block diagram and flow chart demonstrating the provisioning of a secure terminal by a provisioning device using a method to calculate the time elapsed during the provisioning, which can lead to the rejection of the signed certificate, or the acceptance of a signed certificate, and the setting of a clock with a trusted time stamp, in accordance with approaches disclosed herein.

FIG. 4 provides a block diagram and flow chart for a set of methods and systems for provisioning a secure terminal 400 that are in accordance with some of the approaches disclosed herein. In FIG. 4, certain subblocks of the secure terminal 400 and provisioning device 401 are considered to be hidden, which is defined here as to be deliberately omitted from the drawing for purposes of highlighting the elements that are needed for explanation, but are still present with respect to the disclosed approaches. Hidden subblocks on the secure terminal 400 include a certificate signing request generator, an asymmetric key pair comprising a public key and private key, a unique ID number, and a certificate signing request. In addition, a connection, between the certificate signing request generator on the secure terminal to the certificate signing request parser on the provisioning device, is hidden. Hidden subblocks on the provisioning device 401 include a certificate signing request parser, a trusted time source element, and a trusted time stamp. Hidden subblocks can have the same, or similar, properties as those elements have been disclosed previously with respect to FIGS. 2-3, and can have additional properties, as disclosed below.

The methods and systems disclosed in FIG. 4 are related to the tracking of elapsed time between steps in a secure method that can be used as an additional layer of security through the setting of a maximum time a step may use before it is rejected. In relative terms, the maximum step time should land in a window of time lengths that is longer than the amount of time it takes to execute the method step under nominal conditions, and shorter than the amount of time that may be used by a third party to attack the system or any other threat. Another time-dependent security enhancement made possible through the provisioning process is enabled by providing the secure terminal 400 with a trusted time stamp that is used to set the clock 402. When the clock 402, which can track the time that has passed since the installment of the secure terminal 400 battery and relative times passed thereafter, is set to a trusted time provided by a trusted time stamp, then it may participate in secure communications with a network of devices that also rely on verification by the same trusted time. The approaches illustrated by FIG. 4 also relate to methods for assuring that the time stamp provisioned to the secure terminal has not gone stale by the time it is used to set a clock on the secure terminal, such as clock 402.

In one example, the elapsed time can be calculated as to approximate the amount of time that has passed in order to carry out all the data transfer and processing steps that take place from when the secure terminal transmits the key validation request to when the secure terminal receives the key validation. The method can begin by using a relative time, clock time 1 403, to generate relative time stamp 1 404 on the secure terminal 400, wherein relative time stamp 1 404 can be stored in time stamp storage 405 prior to the sending of a certificate signing request. The sending and receiving of the certificate signing request can be accomplished in some limited time (e.g., less than 500 miliseconds). After that, the provisioning device 401 can process the certificate signing request and send, to the secure terminal 400 via a wired connection 406, using a transport protocol that can be nearly instant, the signed certificate with trusted time stamp 407 and reference to a public key 408. After receiving the signed certificate with trusted time stamp 407, the secure terminal 400 can determine an elapsed time by comparing the clock time at the time just after receiving the trusted time stamp, clock time 2 409, to the relative time stamp 1 404. In addition, after receiving the signed certificate with trusted time stamp 407, the secure terminal 400 can parse the signed certificate with trusted time stamp 407 using a certificate parser 409, wherein the parsing process includes obtaining the trusted time stamp from the signed certificate with trusted time stamp 407. The elapsed time can then be compared to a predetermined threshold, which in some cases can be set to one minute.

In another example, the subsequent processes conducted by the secure terminal 400, after the aforementioned elapsed time comparison to a predetermined threshold has concluded, can be contingent on the elapsed time being shorter than the predetermined threshold. If, and only if, this is the case, then clock 402 can be set by the trusted time stamp obtained by certificate parser 409. Subsequently, the cryptographic signature of the signed certificate with trusted time stamp 407 can be validated by the certificate parser 409. In one example, clock 402 can be set to the trusted time stamp by extracting the value from the certificate validity period start time data field in the certificate data. A designer of these systems and methods must consider the estimated time of each method step with respect to the computational requirements, hardware design, and software optimization. The specific approach of setting of the clock before the cryptographic validation of the signature is complete can be advantageous because cryptographic validation is a relatively lengthy process, in some cases several seconds, and, if antecedent to the setting of the clock 402, the trusted time stamp might no longer be germane to the trusted time it was meant to represent. In the case where the elapsed time is longer than the predetermined threshold, the signed certificate can be rejected. Furthermore, if the certificate validation fails, the secure terminal can revoke the validity of the trusted time and either clear the clock, or set a flag indicating that the clock was set with a time that has not been verified to be the secure time.

The process of validating the signed certificate with a trusted time stamp 407 by the certificate parser 409, as described in the previous paragraphs, can be dependent on the public key 408 that it references. When the validation is executed, the certificate parser 409 identifies the referenced public key 408 and searches for its paired private key in the key storage module 410 database. If the matching private key is found, the certificate parser 409 can instruct the key storage module 410 to set the key status field to validated, which can complete the validation process, and after which the signed certificate with trusted time stamp 407 can be stored in the key storage module 410, and can be made available to other secure subblocks on the secure terminal 400.

With reference to any example described previously, the method steps on the provisioning device 401 can include parsing a certificate signing request, setting the certificate validity start time with a trusted time stamp, generating a prototype certificate with trusted time stamp 411, after which it can be transformed into a signed certificate with trusted time stamp 407 through the application of a cryptographic signature by the secure cryptographic element 412, and sending the signed certificate with trusted time stamp 407 to the secure terminal 400. While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. The terminal can be a computer terminal, a smartphone, a point of sale terminal, a repeater, a beacon, a sensor, or any other device that collects and transmits secure information. Although examples in the disclosure are generally directed to provisioning a secure terminal with a trusted time stamp and a key validation, the same approaches could be applied to any situation in which one device enable another device for secure communication on a network including approaches where the provisioning device and secure terminal were homogenous devices. These and other modifications and variations to the present invention may be practiced by those skilled in the art, without departing from the scope of the present invention, which is more particularly set forth in the appended claims.

What is claimed is:

1. A system for provisioning a secure terminal comprising:
a provisioning device; and
one or more non-transitory computer-readable mediums accessible to one or more processors, and
storing instructions which, when executed by the one or more processors, cause the system to:
receive, at the provisioning device, a key validation request for a secure terminal key, from the secure terminal, wherein the key validation request comprises a request to validate the key;
parse the key validation request on the provisioning device;
generate, on the provisioning device and in response to receiving the key validation request, both a key validation and a trusted time stamp;
send, from the provisioning device, the key validation and the trusted time stamp to the secure terminal, wherein the secure terminal stores the key validation if an elapsed time since the trusted time stamp was generated is below a predetermined threshold.

2. The system of claim 1, wherein:
the provisioning device generates the key validation using a secure cryptographic element; and
the trusted time stamp is attached to the key validation.

3. The system of claim 2, wherein:
the trusted time stamp is used by the secure cryptographic element to generate the key validation.

4. The system of claim 1, wherein:
the key validation request is a certificate signing request;
the key validation is a signed certificate;
the signed certificate includes a certificate validity start time field; and
the trusted time stamp is used to set the certificate validity start time.

5. The system of claim 1, wherein:
the key is an asymmetric key pair;
the asymmetric key pair includes a public key and a private key;
the key validation request is a certificate signing request;
the certificate signing request includes the public key;

the key validation request is sent from a certificate signing request generator; and
the key validation is a signed certificate for the public key.

6. The system of claim 1, wherein:
the sending of the key validation request is conducted by a certificate signing request generator;
the parsing of the key validation request is conducted by the certificate signing request parser;
the sending of the key validation and the trusted time stamp is conducted by a secure cryptographic element; and
the storing of the key validation on the secure terminal is conducted by a key storage module.

7. The system of claim 1, wherein:
the key validation request is a certificate signing request;
the key validation is a signed certificate; and
the certificate signing request is generated using a unique identification number of the secure terminal.

8. The system of claim 1, wherein the one or more non-transitory computer-readable mediums further store instructions which, when executed by the one or more processors, cause the system to:
generate a relative time stamp using a clock on the secure terminal;
store, prior to sending the key validation request, the relative time stamp on the secure terminal; and
determine, on the secure terminal and after receiving the key validation, the elapsed time using the relative time stamp.

9. The system of claim 8, wherein the key validation is a signed certificate, and wherein the one or more non-transitory computer-readable mediums further store instructions which, when executed by the one or more processors, cause the system to:
parse the signed certificate using a certificate parser on the secure terminal;
wherein the parsing of the signed certificate includes:
obtaining the trusted time stamp from the signed certificate; and
validating a cryptographic signature of the signed certificate; and
wherein the elapsed time is determined before the validating of the cryptographic signature and after the obtaining of the trusted time stamp.

10. The system of claim 8, wherein:
the provisioning device and the secure terminal are connected via a wired connection;
the sending of the key validation request and the receiving of the key validation request are conducted in less than 500 milliseconds; and
the predetermined threshold is one minute.

11. A non-transitory computer-readable medium accessible to a system for provisioning a secure terminal, wherein the non-transitory computer-readable medium stores instructions which, when executed by the system, cause the system to:
send a key validation request for a secure terminal key, from the secure terminal to a provisioning device, wherein the key validation request comprises a request to validate the key;
parse the key validation request on the provisioning device;
generate, on the provisioning device: (i) a key validation; and (ii) a trusted time stamp attached to the key validation;
send, from the provisioning device, the key validation and the trusted time stamp to the secure terminal; and if an elapsed time, calculated by the secure terminal, since the trusted time stamp was generated is below a predetermined threshold, store the key validation on the secure terminal.

12. The non-transitory computer-readable medium of claim 11, wherein:
the trusted time stamp is used by the provisioning device to generate the key validation.

13. The non-transitory computer-readable medium of claim 11, wherein:
the key is an asymmetric key pair;
the asymmetric key pair includes a public key and a private key;
the key validation request is a certificate signing request;
the certificate signing request includes the public key;
the key validation request is sent from a certificate signing request generator; and
the key validation is a signed certificate for the public key.

14. The non-transitory computer-readable medium of claim 11, wherein:
the sending of the key validation request is conducted by a certificate signing request generator;
the parsing of the key validation request is conducted by a certificate signing request parser;
the sending of the key validation and the trusted time stamp is conducted by a secure cryptographic element;
the setting of a clock on the secure terminal is conducted by a certificate parser; and
the storing of the key validation on the secure terminal is conducted by a key storage module.

15. The non-transitory computer-readable medium of claim 11, wherein:
the key validation request is a certificate signing request;
the key validation is a signed certificate; and
the certificate signing request is generated using a unique identification number of the secure terminal.

16. A system for provisioning a secure terminal comprising:
one or more secure terminal processors on the secure terminal that:
send a key validation request for a key of the secure terminal to a provisioning device, wherein the key validation request comprises a request to validate the key;
receive a trusted time stamp from the provisioning device;
receive and parse a key validation from the provisioning device; and
store the key validation from the provisioning device;
a clock on the secure terminal that is set using a trusted time stamp from the provisioning device, wherein the clock on the secure terminal generates a relative time stamp, wherein the secure terminal stores the relative time stamp prior to sending the key validation request,
wherein the secure terminal determines an elapsed time period using the clock and the relative time stamp after receiving the key validation, and
wherein the secure terminal verifies the key validation, and the clock on the secure terminal is set using the trusted time stamp when the key validation is verified if the elapsed time period is less than a predetermined threshold.

17. The system of claim 16 wherein the one or more provisioning device processors further comprise:
a secure cryptographic element, wherein:
the secure cryptographic element generates the key validation in response to the key validation request; and
the secure cryptographic element sends the trusted time stamp and key validation to the secure terminal using the connection after the key validation generation.

18. The system of claim 17, wherein:
the secure cryptographic element generates the key validation using the trusted time stamp.

19. The system of claim 16, wherein:
the key validation request is a certificate signing request;
the key validation is a signed certificate; and
the provisioning device contains a secure cryptographic element for parsing the certificate signing request and generating the signed certificate.

* * * * *